Patented Aug. 24, 1937

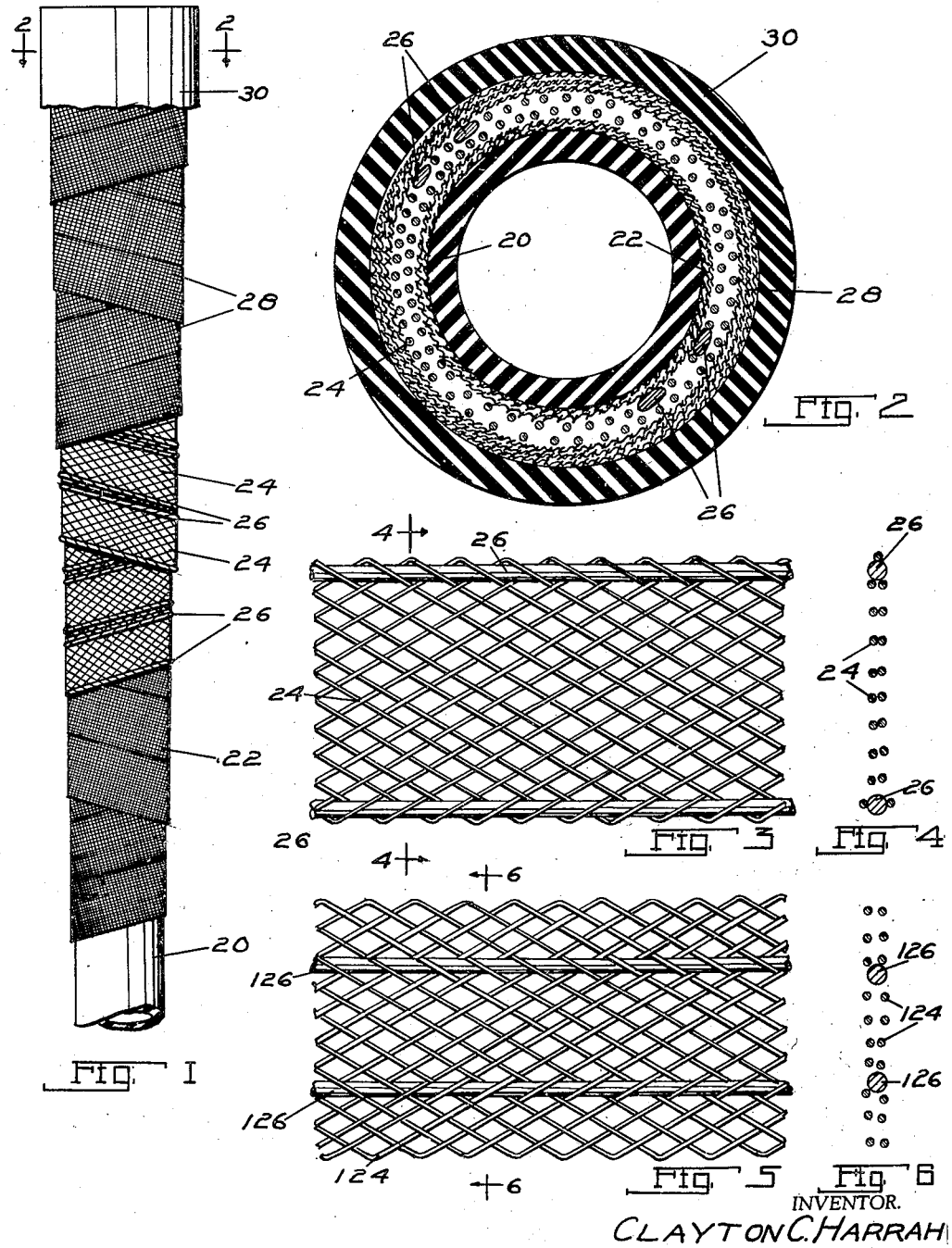

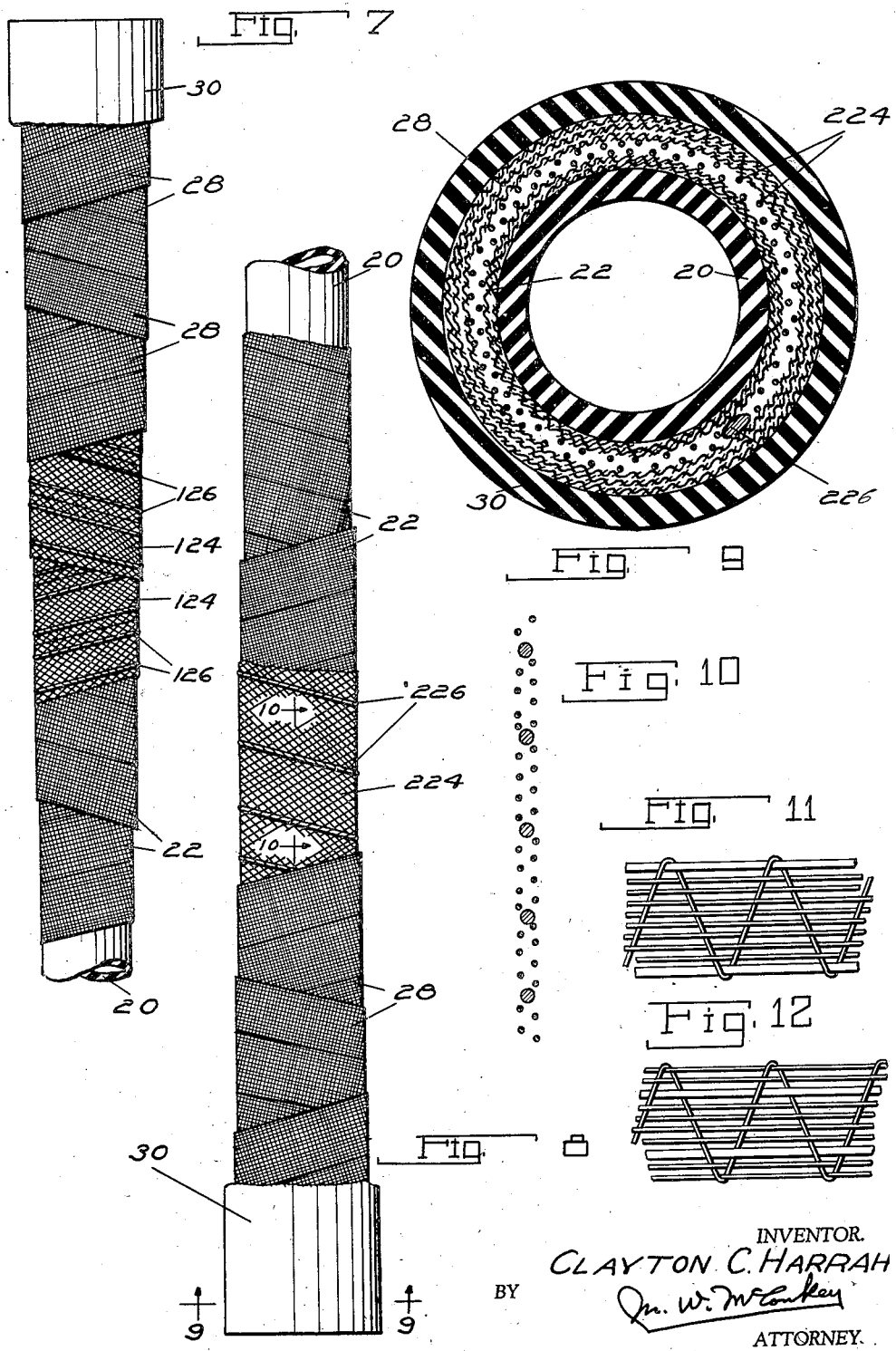

2,090,794

UNITED STATES PATENT OFFICE 2,090,794

REINFORCED RUBBER ARTICLE

Clayton C. Harrah, Niles, Mich., assignor to National Standard Company, Niles, Mich., a corporation of Michigan Application July 23, 1934, Serial No. 736,527

5 Claims. (Cl. 138—56)

This invention relates to the manufacture of rubber articles such as hose, and especially to their reinforcement by means such as very heavy wires.

It has always been difficult to secure reinforcement by means of such heavy wires, as the wires tend to cut the rubber and to become loosened in time as the rubber works back and forth over them. At the same time such reinforcing means has many advantages, if it can be kept from cutting and from working loose. For example, a hose reinforced in this manner resists collapsing and crushing strains (e. g. when used for vacuum lines) as well as bursting strains.

An object of the present invention is to secure the advantages of such heavy and stiff reinforcing wires, by providing means such as a braid of small flexible wires carrying and enmeshing the heavy wire or wires, the whole being embedded in the rubber and with the pressures of a considerable area of the hose body acting on each wire.

Preferably the wires of the braid loop back and forth about the heavy wire, to lock it firmly thereto throughout its length. The braid may be wound helically about the hose axis, preferably between two of the layers of the usual fabric, and I prefer to wind two such braids, one on top of the other, in opposite directions to break the joints, so that there is no tendency to break the hose down opposite the joints between successive convolutions.

In some cases sufficient strength can be secured by using a tubular braid to carry the enmeshed heavy wire, which in this case is preferably wound helically about the axis of the braid.

Many of the advantages of the invention can be secured by enmeshing the heavy reinforcing wires in smaller wires which are woven into a tape.

The above and other objects and features of the invention, including various novel combinations and arrangements, and desirable particular constructions, will be apparent from the following description of the illustrative embodiments shown in the accompanying drawings, in which:

Figure 1 is a side elevation of a reinforced hose embodying the invention, broken away to show the various layers;

Figure 2 is a section through the hose on the line 2—2 of Figure 1;

Figure 3 is an enlarged plan view of one form of braid, having reinforcing wires enmeshed therein at the edges;

Figure 4 is a section through this braid, on the line 4—4 of Figure 3;

Figure 5 is a similar plan view of another braid having reinforcing wires enmeshed therein some distance from the edges;

Figure 6 is a section through this braid on the line 6—6 of Figure 5;

Figure 7 is a view similar to Figure 1 but showing the braid of Figures 5 and 6;

Figure 8 is a view similar to Figures 1 and 7 but having a single reinforcing layer formed of a tubular braid having a heavy wire enmeshed therein and helically carried thereby;

Figure 9 is a section on the line 9—9 of Figure 8;

Figure 10 is a section through the tubular braid, on the line 10—10 of Figure 8; and Figures 11 and 12 show the reinforcing wires carried by a woven tape.

The novel hose shown in Figures 1-3 includes a central tubular rubber portion 20, over which are wound helically layers 22 of canvas or other fabric reinforcement. The drawings show two such layers, wound in opposite directions.

Over the fabric layer is wound the metallic reinforcement. As shown in Figure 1, this comprises two layers, wound helically in opposite directions so as to break joints, of braid 24 of flexible and relatively light wires, having enmeshed therein along the opposite edges relatively stiff and heavy wires 26.

The interwoven wires of the braid 24 loop over the heavy wires 26 at the edges of the braid, where the lighter wires turn back on themselves to continue back across the braid. These lighter wires are braided, by being alternately underpassed and overpassed to form a braided fabric, and all of them preferably loop about the heavy wires when they reach the edge of the braid.

If desired, additional fabric layers may next be added, two layers 28 of canvas wound helically in opposite directions being shown. A final layer 30 of rubber is formed about the whole.

The hose so built up is cured in the usual manner. The rubber from layers 20 and 30 not only permeates the fabric 22 and 28; it also flows through the meshes of the braid 24 and about the heavy reinforcing wires 26 so that they are completely imbedded therein.

It will be seen that the braid 24, or its equivalent, transmits to the wires 26 the pressures acting on considerable areas of the hose body, not only obviating any tendency of the wires 26 to cut the rubber, but also insuring that the rubber will not tend to push through between the convolutions of the reinforcing wire.

The braid 24 has a high tensile strength, and aids the heavy wires in reinforcing the hose against internal bursting pressures. The heavy wires, however, are of the greatest utility in reinforcing the hose against collapsing or crushing pressures, as when the hose is used for a vacuum line.

In the arrangement of Figures 5-7, two braids 124 are oppositely wound as described above, but the reinforcing wires in each braid are two relatively heavy and stiff parallel wires 126 spaced inwardly from the edges of the braid.

In Figures 8-10, the hose is reinforced with a tubular wire braid 224, arranged coaxially of the hose between the fabric layers, and reinforced by one or more helically-arranged heavy wires 226. The wire 226 is not looped over by every strand of the braid, but skips enough of them to give it sufficient inclination to secure the desired helical arrangement.

In all of the above-described constructions, the wire of the braid may be round or flat or of any other desired shape in cross-section.

For some purposes, many advantages of the invention may be obtained by enmeshing heavy reinforcing wires 426 at the edges of a tape woven with longitudinal smaller wires 424 held by a cross-wire 428 woven there-through. In the construction shown in Figure 12 the heavy reinforcing wires 526 are arranged about one-third of the way inward from the edges of a tape woven from longitudinal wires 524 and cross-wires. The term "tape" as used herein is intended to include such woven constructions as well as a braided tape, and other constructions in which small flexible wires are formed into a sheet having interstices enmeshing a heavy and substantially straight reinforcing wire.

While several illustrative embodiments have been described in detail, it is not my intention to limit the scope of the invention to those particular embodiments, or otherwise than by the terms of the appended claims.

I claim:

1. A hose comprising a tubular body of rubber material having a tubular metallic layer of flexible wires embedded therein, and a stiff and heavy reinforcing wire enmeshed in and carried by said layer and embedded therewith in the rubber material and reinforcing the hose body both against expansion due to internal pressure and against collapsing due to internal suction, said layer transmitting to said heavy wire the forces acting on considerable areas of the hose body.

2. A hose comprising a tubular body of rubber material having a tubular metallic layer comprising two tapes of flexible wires wound in opposite helices about the body of rubber material and embedded therein, and stiff and heavy reinforcing wires enmeshed in and carried by said tapes and embedded therewith in the rubber material and reinforcing the hose body both against expansion due to internal pressure and against collapsing due to internal suction, said layer transmitting to said heavy wires the forces acting on considerable areas of the hose body.

3. A hose comprising a tubular body of rubber material having a tubular metallic layer of flexible wires embedded therein, and a stiff and heavy reinforcing wire enmeshed in and carried by said layer and embedded therewith in the rubber material and reinforcing the hose body both against expansion due to internal pressure and against collapsing due to internal suction, said layer transmitting to said heavy wire the forces acting on considerable areas of the hose body, and said layer being formed of tape comprising a plurality of said flexible wires interwoven together and having the reinforcing wire interwoven along the edge thereof.

4. A hose comprising a tubular body of rubber material having a tubular metallic layer of flexible wires embedded therein, and a stiff and heavy reinforcing wire enmeshed in and carried by said layer and embedded therewith in the rubber material and reinforcing the hose body both against expansion due to internal pressure and against collapsing due to internal suction, said layer transmitting to said heavy wire the forces acting on considerable areas of the hose body, and said layer being formed of tape comprising a plurality of said flexible wires interwoven together and having two strands of the reinforcing wire interwoven therewith parallel to, but spaced from, each edge thereof.

5. A hose comprising a tubular body of rubber material having a tubular metallic layer of flexible wires embedded therein, and a stiff and heavy reinforcing wire enmeshed in and carried by said layer and embedded therewith in the rubber material and reinforcing the hose body both against expansion due to internal pressure and against collapsing due to internal suction, said layer transmitting to said heavy wire the forces acting on considerable areas of the hose body, said layer being formed of a plurality of said flexible wires braided in the form of a tube and having the reinforcing wire interwoven therewith in the form of a helix about the tube.

C. C. HARRAH.